United States Patent
Dube et al.

(10) Patent No.: US 11,417,004 B2
(45) Date of Patent: Aug. 16, 2022

(54) VARIABLE TRANSFORMS FOR THREE-DIMENSIONAL ENGINES

(71) Applicant: VMware, Inc., Palo Alto, CA (US)

(72) Inventors: Arjun Dube, Palo Alto, CA (US); Andrew Buccellato, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 4 days.

(21) Appl. No.: 17/000,453

(22) Filed: Aug. 24, 2020

(65) Prior Publication Data
US 2022/0058816 A1    Feb. 24, 2022

(51) Int. Cl.
*G06T 7/33*    (2017.01)
*G06T 17/10*    (2006.01)
*G06T 7/37*    (2017.01)

(52) U.S. Cl.
CPC .............. *G06T 7/344* (2017.01); *G06T 7/37* (2017.01); *G06T 17/10* (2013.01)

(58) Field of Classification Search
None
See application file for complete search history.

(56) References Cited

U.S. PATENT DOCUMENTS

| | | | | |
|---|---|---|---|---|
| 6,326,963 | B1 * | 12/2001 | Meehan | G06T 19/00 345/419 |
| 10,217,488 | B1 * | 2/2019 | Huang | H04N 5/247 |
| 2010/0053325 | A1 * | 3/2010 | Inagaki | G06T 5/006 382/282 |
| 2018/0232954 | A1 * | 8/2018 | Frank | A01C 3/02 |
| 2020/0007841 | A1 * | 1/2020 | Sedeffow | G06T 7/70 |
| 2020/0334788 | A1 * | 10/2020 | Izumi | G06T 3/4038 |

* cited by examiner

*Primary Examiner* — James A Thompson
(74) *Attorney, Agent, or Firm* — Thomas Horstemeyer, LLP

(57) ABSTRACT

Disclosed are various embodiments of variable transform systems for three-dimensional engines. In some aspects, transform data is identified for an object. The object is associated with a base transform class of a three-dimensional engine. A variable transform class generates global transform data using the transform data. The global transform data is expressed according to a cartesian coordinate system used by the three-dimensional engine. The variable transform class provides the global transform data to the base transform class of the three-dimensional engine to position the object in world space.

20 Claims, 7 Drawing Sheets

VARIABLE TRANSFORMS FOR THREE-DIMENSIONAL ENGINES

BACKGROUND

Game engines and other three-dimensional engines can be used to create games, productivity applications, user interfaces, product demonstrations, and other programs. These three-dimensional engines can enable developers to create manufacturing, engineering, healthcare, retail, education, defense, gaming, and other types of applications. For example, a three-dimensional engine can offer inspector interfaces and editing user interfaces. These interfaces can modify script-based and other transform properties for intuitively manipulating the transform of an object in three-dimensional world space. However, these interfaces are restricted to a Cartesian coordinate system.

The increasing use of curved user interfaces, virtual reality, cross-reality, and augmented reality has increased the possibilities to use alternative non-Cartesian coordinate systems such as cylindrical and spherical coordinate systems. One solution could include locking or snapping objects to a curved object or curved set of cartesian coordinates. However, these sorts of solutions only mimic effects of alternative coordinate systems. As a result, there is a need for more robust non-Cartesian coordinate system editing solutions for game engines and other three-dimensional engines.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to variable transforms for game engines and other three-dimensional engines. The variable transforms can use variable meshes or graphics. The three-dimensional engines can be used to create games, productivity applications, user interfaces, product demonstrations, and other programs. The increasing use of curved user interfaces, virtual reality, cross-reality, and augmented reality has increased the possibilities to use alternative non-Cartesian coordinate systems such as cylindrical and spherical coordinate systems. Existing technologies only mimic or emulate alternative coordinate system parameters like orbitals and radial views which allow a user to define some abstracted polar qualities outside the context of a non-Cartesian system. In addition, systems that mimic the effect of aligning a mesh to an alternative coordinate system such as curved user interface assets, simply project the cartesian graphic onto a cylindrical/spherical mesh to mimic polar control. By contrast, the present disclosure describes mechanisms that enable transform hierarchies and other hierarchical effects, true alternative coordinate system mesh modifications, as well as an integrated inspector and editor. These features are provided by components that exist on top of the existing transform system of the three-dimensional engine, and match the corresponding features.

Figure 1:
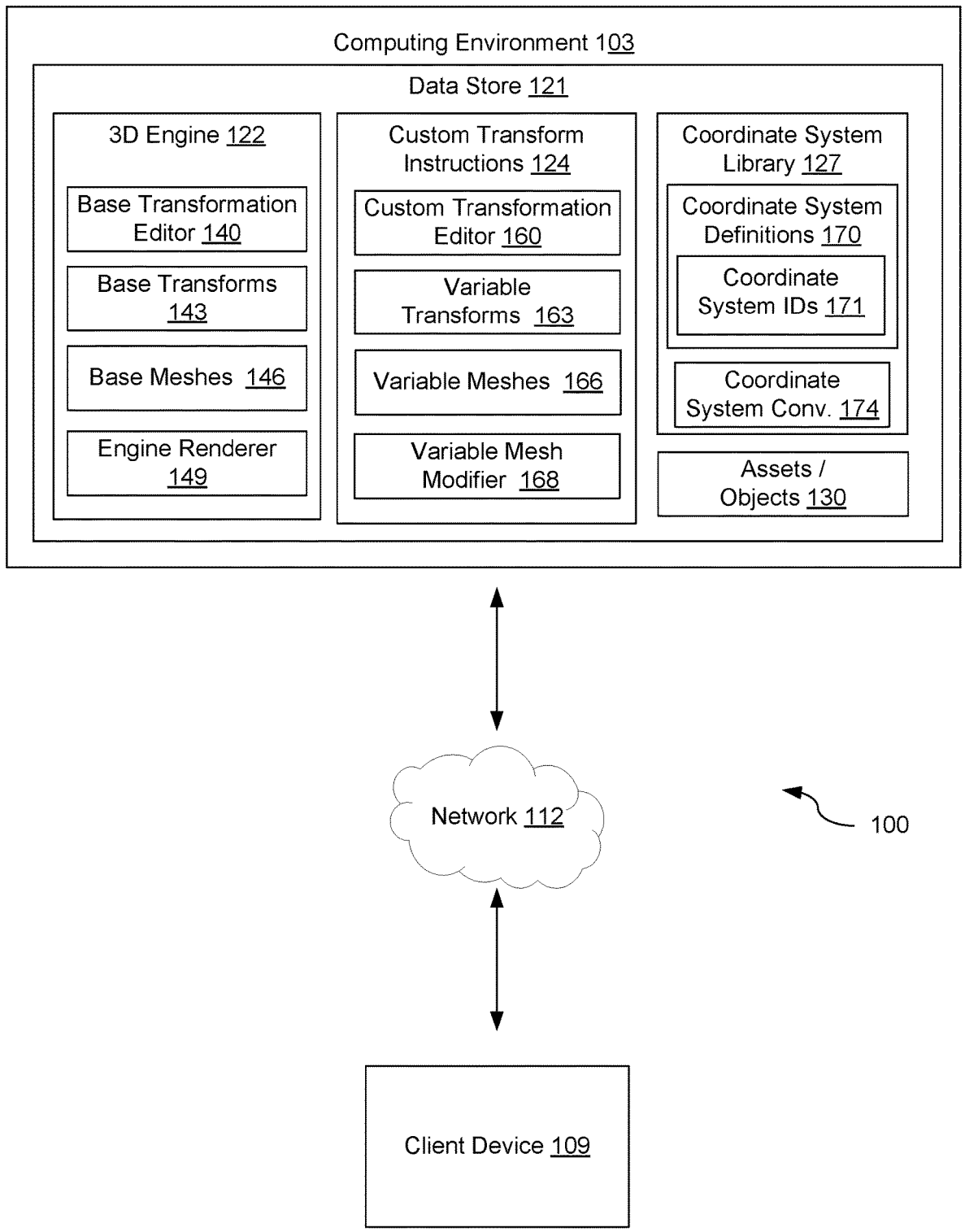
FIG. 1 is a drawing depicting an example of a networked environment that implements a variable transform for a three-dimensional engine, according to various embodiments of the present disclosure.

With reference to FIG. 1, shown is an example of a networked environment 100. The networked environment 100 can include a computing environment 103 and client devices 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802. 11 wireless networks (e.g., Wi-Fi®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can execute program instructions including a three-dimensional engine 122 and custom transform instructions 124. The components executed on the computing environment 103 can include other applications, services, processes, systems, engines, or functionality not discussed in detail herein. The components executed on the computing environment 103 can be stored in the data store 121 of the computing environment 103. The computing environment 103 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The functionalities discussed with respect to the computing environment 103 can be provided to the client devices 109 by transmitting and installing the various components to the client devices 109. The functionalities provided by the computing environment 103 can also be provided by exposing application programming interfaces (APIs), web applications, user interfaces, and other components that are accessible by the client devices 109 over the network 112. For example, the computing environment 103 can transmit, to a client device 109, a network address through which the client device 109 can access a particular functionality or set of functionalities through APIs, web applications, user interfaces, and other components.

The data store 121 can include any storage device or medium that can contain, store, or maintain the instructions, logic, or applications described herein for use by or in connection with the computing environment 103. The data store 121 can be a hard drive, or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include the memory of the computing environment 103, mass storage resources of the computing environment 103, or any other storage resources on which data can be stored by the computing environment 103. The data stored in the data store 121 can include, for example, the three-dimensional engine 122, the custom transform instructions 124, coordinate system libraries 127, as well as assets and objects 130. Assets and objects 130 can include objects, graphics, meshes, and other data that are utilized by the engine renderer 149 to render a three-dimensional object or world space for display.

The three-dimensional engine 122 can include a base transform editor 140, base transforms 143, base meshes 146, and an engine renderer 149, among other components. The base transform editor 140 can include a user interface of the three-dimensional engine 122 that allows a user to position and edit game, interface, and other objects 130 in a three-dimensional world space of the engine. The base transform editor 140 can edit coordinate or transform data of the base transforms 143 based on user interactions detected through a user interface. Transform data can include position, rotation, scale, and animations, all of which can be expressed as transform properties of the base transforms 143. Base transform properties of the base transforms 143 can be expressed or described in a native coordinate system of the three-dimensional engine 122. Generally, the native coordinate system of the three-dimensional engine 122 can be a Cartesian coordinate system. However, in other cases, the native coordinate system of the three-dimensional engine 122 can be any other coordinate system.

The base transforms 143 can include base transform classes of the three-dimensional engine 122, as well as base transform objects and other base transform data. The base meshes 146 can include base mesh data such as base vertex positions.

The engine renderer 149 can include an object renderer, a mesh renderer, and other rendering components of the three-dimensional engine 122. The engine renderer 149 can render objects 130, as well as related meshes for display on a display device of the client device 109 or the computing environment 103.

The custom transform instructions 124 can include a custom transform editor 160, variable transforms 163, variable meshes 166, and a variable mesh modifier 168, among other components. In some cases, the coordinate system library 127 can be considered a portion of the custom transform instructions 124. The custom transform editor 160 can include a user interface with a set of user interface elements that operate separately from the base transform editor 140. Alternatively, the custom transform editor 160 can include a set of user interface elements that augment or modify the base transform editor 140.

The custom transform editor 160 can enable a user to select from a set of coordinate systems that include the native (e. g., Cartesian) coordinate system of the three-dimensional engine 122, as well as a number of non-native (e. g., non-Cartesian) coordinate systems that are different from the native coordinate system of the three-dimensional engine 122. Once a non-native coordinate system is selected, the custom transform editor 160 can enable manipulation of an object 130 according to non-native coordinate system rules. For example, the custom transform editor 160 can enable a non-Cartesian manipulation of the object 130, such as moving the object a predefined angle or arclength at a particular radius in a spherical or cylindrical coordinate system. The custom transform editor 160 can include a user interface of the three-dimensional engine 122 that allows a user to position and edit game objects, interface objects, and other objects 130 in a three-dimensional world space of the engine according to non-native coordinate system rules of a selected coordinate system.

The user manipulations identified through the custom transform editor 160 can affect or edit transform data for the variable transforms 163 based on user interactions. The variable transforms 163 can include variable transform classes of a variable transform software development kit (SDK), as well as variable transform objects and other data. The variable meshes 166 can include a variable mesh class or other variable mesh instructions as well as modified mesh data generated by the instructions. The variable mesh 166 can identify base mesh data as well as store and/or provide the modified mesh data to a mesh renderer. The modified mesh data can include modified vertex positions that are modified in order to maintain even spacing within a selected non-native or non-Cartesian coordinate system. The variable mesh modifier 168 can perform a modification of the base mesh 146 to achieve even spacing within the selected non-native or non-Cartesian coordinate system.

If an object 130 contains a base mesh 146 that requires re-mapping, a variable mesh 166 class can intercept the mesh data before it reaches the mesh renderer or engine renderer 149 of the three-dimensional engine 122. The variable mesh 166 can pass the mesh through to the series of mesh modification methods or a variable mesh modifier 168. A quad extractor can divide the mesh up into quads and then pass those quads into a quad tessellation function for tessellation. The quad tessellation function or method can tessellate a quad until it has reached the defined subdivision size according to a tessellation value. This allows a user to balance meshes alignment to space against the need for additional vertices. The UVs can be remapped to accommodate for the additional vertices. Once all quads have been subdivided the modified mesh can be passed through an alignment method that modifies the vertices individually such that their distances along a target system axis matches their distances along the corresponding origin system axis. This allows, for example, a planar mesh to be projected into cylindrical space, curving it. The finalized modified mesh can be passed through to the mesh renderer for rendering.

The custom transform editor 160 can also show effects of hierarchical or inherited transform data during a user manipulation of an object 130. Hierarchical effects can be based on variable transforms 163 for the object 130 as well as parent variable transforms, or parent instances of the variable transform 163 for the object. Parent instances of the variable transform 163 can include variable transforms 163 of other objects, or parent variable transforms 163 that are not associated with another object. In either case, the parent instances of the variable transform 163 can affect position, rotation, scale, animation, and other transform data of the object 130.

The custom transform editor 160 can identify transform data based on user manipulations and inherited transform data, and edit the variable transforms 163. The variable transforms 163 can maintain, process, and store this transform data as transform properties of the variable transforms 163. Variable transform properties of the base transforms 143 can be expressed or described in the selected non-native or non-Cartesian coordinate system. The non-native coordinate system can include a spherical coordinate system, a cylindrical coordinate system, or a custom coordinate system. For the purposes of example, a custom coordinate system can define transform data according to a function such as a sine wave that extends along or around an axis.

The transform data for the variable transform 163 for the object 130 can include position, rotation, scale, and animations, all of which can be expressed as transform properties of the variable transform 163. As discussed earlier, the object 130 can be associated with a base transform class of the three-dimensional engine expressed or described in a native coordinate system of the three-dimensional engine 122. However, the custom transform instructions 124 can provide a separate variable transform 163 for the object 130, which enables true custom coordinate system manipulations by enabling inherited transform data and other hierarchical effects on top of the existing transform system of the three-dimensional engine. The variable transform 163 can describe properties of the object 130 according to a selected non-native and non-Cartesian coordinate system, enabling users to enter and edit the object directly in the selected coordinate system.

The coordinate system libraries 127 can include coordinate system definitions 170. The coordinate system definitions 170 can each be associated with a corresponding coordinate system identifier 171 or name. In other words, a coordinate system identifier 171 can uniquely identify a coordinate system defined by a coordinate system definition 170. The coordinate system library 127 can also include coordinate system conversions 174 that are capable of converting transform data from one coordinate system format into another.

Spherical transform data can define a position of an object 130 according to a global or relative origin, a polar measure from a polar axis, an azimuthal measure from an azimuthal axis, and a radial distance from the origin. Cylindrical transform data can define a position of an object 130 according to a global or relative origin, a polar measure from a polar axis, a radial distance from longitudinal axis, and a height or elevation along the longitudinal axis. Cartesian transform data can define a position of an object 130 according to a global or relative origin, and three distances of perpendicular projections from the position along three coordinate axes of the Cartesian coordinate system. The custom transform instructions 124 can access the coordinate system library 127 in order to perform these conversions, as discussed in further detail below.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system can be stored in a data store that also includes applications and other data. The client device 109 can access the functionality described for the components of the computing environment 103. The client device 109 can be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine, a voice activated smart device, or a kiosk that is located in a particular location, or is not easily portable.

The client device 109 can access network content served up by the computing environment 103 or other servers, and can present this information to a user through one or more user interface devices. For example, the client device 109 can render a user interface on a display, such as a liquid crystal display (LCD), organic light emitting diode (OLED) display, touch-screen display, or other type of display device. The client device 109 can also present audio information using an audio device and can provide haptic or physical feedback using a haptic device.

Figure 2A:
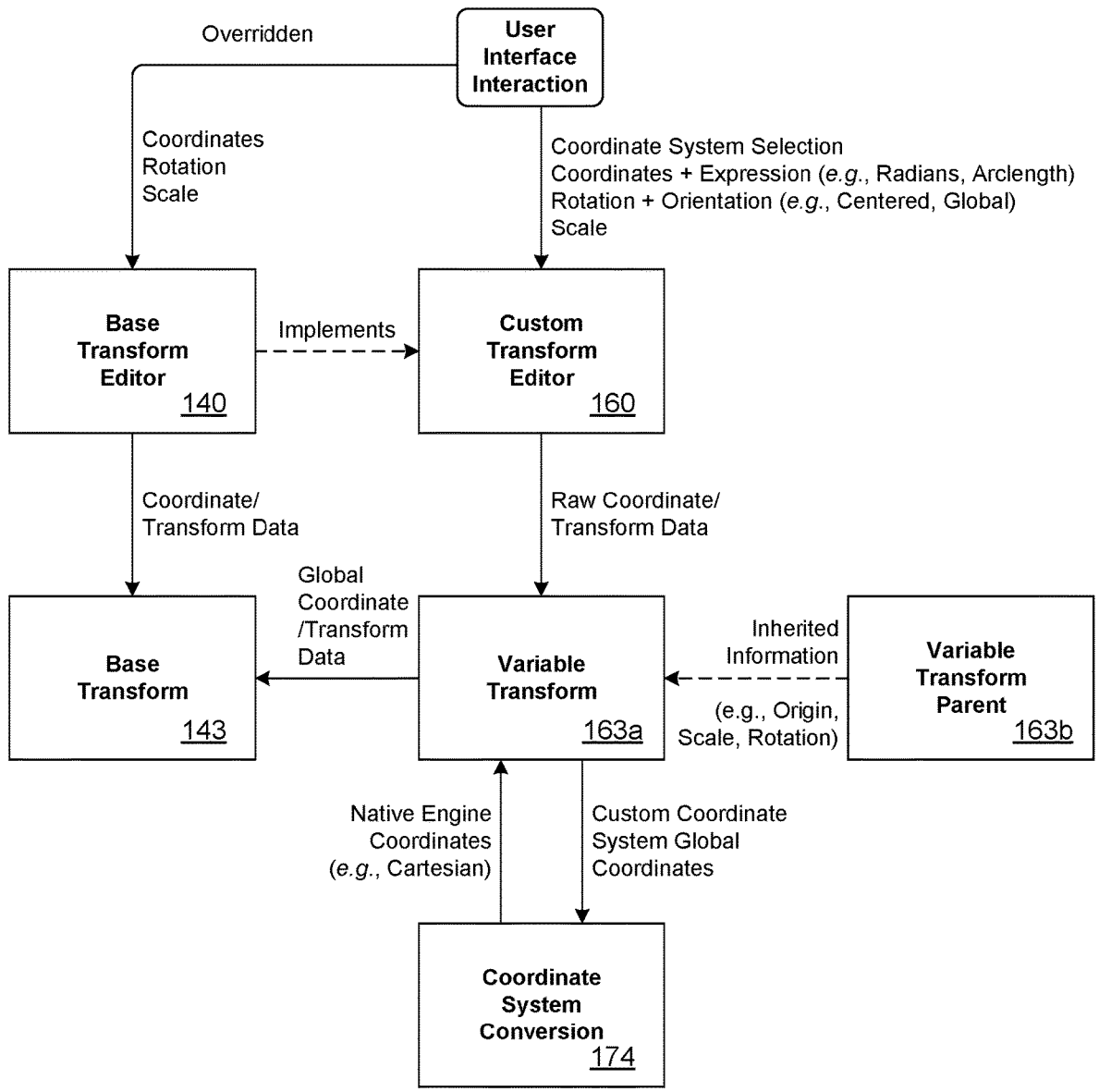
FIG. 2A is a drawing depicting an example of the implementation of a variable transform for a three-dimensional engine, according to various embodiments of the present disclosure.

FIG. 2A shows an example of the implementation of a variable transform 163 for a three-dimensional engine 122. While the figure generally describes the operation of the variable transform 163, some of the functionalities described involve other components of the networked environment 100 of FIG. 1. Generally, a user can interact with either the custom transform editor 160 or directly with the variable transform properties and methods of the variable transform 163a to assign a coordinate system, the coordinates themselves, transformation modifiers including scale and rotation, as well as expression modifiers including radian vs arclength usage.

These values can be passed to the variable transform 163a where they are modified by the inherited properties of any parents such as the parent variable transform 163b. The values can be passed through to the coordinate system conversion 174 of the coordinate system library 127 to undergo the arithmetic conversion back to Cartesian space. The variable transform 163a can then pass this Cartesian transform data back to the base transform component that actually controls the object 130 within the three-dimensional engine 122. This allows a user to interact with the object 130 exclusively in the systemic and expression type of their choice, but allows the base transform 143 class to receive the transform information in a format it can process (e.g., Cartesian).

Expression type can refer to a value type or unit type used for any specified coordinate parameter of a coordinate system. For example, a cylindrical coordinate system can be expressed in radius, azimuth, and height. The expression type of the radius can be a distance unit from a local or global origin. The expression type of the azimuth can be a radius-independent arclength distance, a radius-dependent arclength distance, degrees from a specified axis, or radians from a specified axis. The expression type of the height can be a distance unit from a specified plane, and so on.

Inheritance parameters on each transform can define the relative origin for systems with local coordinates that are ambiguous as it pertains to additive or relative coordinate inheritance. This allows for constructions like multiple polar orbitals as well as relative arclength translations. Any relevant change to a variable transform 163b also automatically cascades down to its children such as the variable transform 163a.

In the example shown, a user can interact with a user interface that includes elements generated by the custom transform editor 160, which can override the base transform editor 140. The custom transform editor can operate on top of the base transform editor 140 or in lieu of the base transform editor 140. In some cases, the custom transform editor 160 can inherit, utilize, or obtain implements from the base transform editor 140.

The custom transform editor 160 can enable a user to select from a set of coordinate systems that include the native coordinate system of the three-dimensional engine 122, as well as a number of non-native coordinate systems that are different from the native coordinate system of the three-dimensional engine 122.

Once a non-native coordinate system is selected, the custom transform editor 160 can enable manipulation of an object 130 according to non-native coordinate system rules. For example, the custom transform editor 160 can enable a non-Cartesian manipulation of the object 130 such as moving the object according to radians, degrees, or arclength, and at a particular radius in the selected non-Cartesian coordinate system.

The custom transform editor 160 can provide or transfer raw transform data in the selected non-Cartesian coordinate system to a variable transform 163a, which can include an instance of a variable transform class of a variable transform SDK. The variable transform 163a can include a core class that stores and modifies transform data according to an alternative or non-native coordinate system. The variable transform 163a can receive input from the custom transform editor 160, which can receive or retrieve hierarchical information from any parent variable transforms 163b, and can use the coordinate system library 127 to perform conversions. The information stored by the variable transform class can also be considered part of the variable transform 163a.

The variable transform 163a can obtain the non-Cartesian transform data, as well as inherited transformation or transform data from a parent variable transform 163b. The parent variable transform 163b can include a parent instance of the variable transform 163a. In some cases, the variable transform 163a and the parent variable transform 163b can include a specification of the hierarchical parent/child relationship. The custom transform editor 160 can include a user interface element that enables a user to define the hierarchical relationship between the variable transform 163a and the parent variable transform 163b.

While the variable transform 163a can express transformation and other transform data in the currently selected coordinate system, it can also store this data temporarily or durably. The parent variable transform 163b can express its transform data in any previously selected coordinate system, including a native or Cartesian coordinate system of the three-dimensional, or any non-native, non-Cartesian coordinate system defined in the coordinate system library 127. For example, the variable transform 163a can be expressed in a cylindrical coordinate system while the parent variable transform 163b can be expressed in a spherical coordinate system. In another example, the variable transform 163a can be expressed in a Cartesian coordinate system while the parent variable transform 163b can be expressed in a cylindrical coordinate system, and so on.

The variable transforms 163a and 163b can be referred to as a nested set of variable transforms 163. While this nested set of variable transforms 163 has a parent and a child, other nested variable transforms 163 can specify any number of parent-child relationships in a hierarchical relationship defined through user interaction with a textual or visual user interface of the custom transform editor 160. Unlike existing simulated non-Cartesian effects that only mimic non-Cartesian effects, the custom transform instructions 124 provide tools that enable extendible and expandable non-native and non-Cartesian transformations, as well as nested variable transforms 163 that include both Cartesian and non-Cartesian variable transforms 163. Since each of the variable transforms 163 are maintained in their respective coordinate system, each is selectable and editable visually or textually through the custom transform editor 160 or textually through textual editing programs.

The variable transform 163a can access coordinate system conversions 174 to convert between coordinate systems. For example, if there is no parent variable transform 163b, the variable transform 163a can access the coordinate system conversions 174 to convert its non-Cartesian transform data into native Cartesian transform data. The variable transform 163a can then edit or transfer this transform data to the base transform 143 in native Cartesian format.

Where there is a nested set of variable transforms 163a and 163b, then the variable transform 163a can access coordinate system conversions 174 to convert the variable transforms 163a and 163b to a common or same coordinate system so they can be combined into global transform data. Ultimately, the global transform data is converted to native Cartesian transform data and provided to the base transform 143. For example, the combination of the nested set of variable transforms 163a and 163b can be performed in a Cartesian coordinate system. Each of the variable transforms 163a and 163b can be converted to the Cartesian coordinate system, combined, and provided to the base transform 143. Alternatively, one of the nested set of variable transforms 163a and 163b can be converted to a coordinate system of the other, combined, and then the combined or global transform data can be converted into Cartesian transform data and provided to the base transform 143.

Figure 2B:
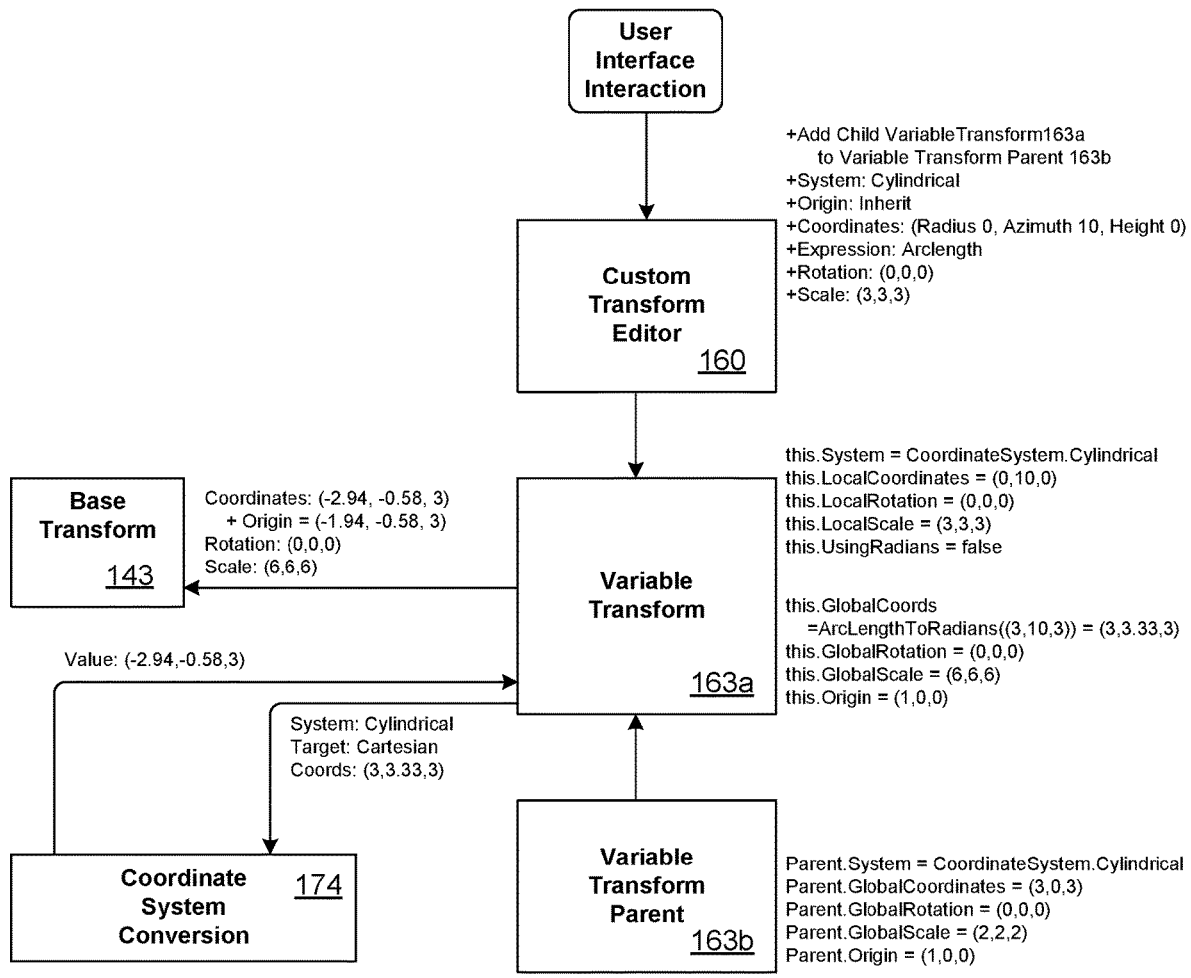
FIG. 2B is a drawing depicting another example of the implementation of a variable transform for a three-dimensional engine, according to various embodiments of the present disclosure.

FIG. 2B shows an example of the implementation of a variable transform 163 for a three-dimensional engine 122. While the figure generally describes the operation of the variable transform 163, some of the functionalities described involve other components of the networked environment 100 of FIG. 1.

In this nonlimiting example, a user can interact with the custom transform editor 160 to add a child variable transform 163a to an existing parent variable transform 163b. The user can specify that the coordinate system for the variable transform 163a is cylindrical. The custom transform editor 160 can then load a number of user interface elements that enable the user to modify the variable transform 163a according to the cylindrical coordinate system. The user can also specify an origin (e. g., relative local coordinates, or inherit), the coordinates, an expression type for a coordinate parameter, a rotation, and a scale. In this example, the origin can be set to inherit. The expression type can be arclength. The custom transform editor 160 can provide transform data to the variable transform 163a, expressed in cylindrical coordinate system as radius 0, azimuth 10, and height 0. The rotation can be (0, 0, 0), and the scale can be (3, 3, 3). The variable transform 163a can identify this local transformation data for an object 130, and temporarily or durably store it.

The variable transform 163a can also identify inherited transform data from the parent variable transform 163b. The parent variable transform 163b can be a transform class that was previously designed or edited using the custom transform editor 160. In this example, the parent coordinate system can be cylindrical, so both the parent and child coordinate systems are expressed in cylindrical coordinates. In other cases, the parent and child coordinate systems can be different. The global transform data for the parent variable transform 163b can include data expressed in cylindrical coordinate system as radius 3, azimuth 0, and height 3. The rotation can be (0, 0, 0), and the scale can be (2, 2, 2).

The variable transform 163a and the parent variable transform 163b can be considered a nested set of variable transforms. Each of these variable transforms can be separate classes provided by the custom transform instructions 124, and each can modify and store transform data for an object 130 separately from the base transform 143 of the object 130. The variable transform 163a can combine the local transform data of the variable transform 163a with the global transform data of the parent variable transform 163b.

Specifically, the local coordinates (0, 10, 0) of the variable transform 163a can be combined with the global coordinates (3, 0, 3) of the parent variable transform 163b to generate a global coordinates (3, 10, 3) of the variable transform 163a and the object 130. Since the expression of the azimuth is provided in arclength expression, the arclength can be internally converted to radians. The local rotation (0, 0, 0) of the variable transform 163a can be combined with the global rotation (0, 0, 0) of the parent variable transform 163b to generate a global rotation (0, 0, 0) of the variable transform 163a and the object 130. The local scale (3, 3, 3) of the variable transform 163a can be combined with the global scale (2, 2, 2) of the parent variable transform 163b to generate a global scale (6, 6, 6) of the variable transform 163a and the object 130.

The variable transform 163a can provide the coordinate system conversion 174 with the global coordinates (3, 3.33, 3) in cylindrical coordinates, along with the coordinate system identifier of the source coordinate system, and a target coordinate system to provide to the base transform 143. The coordinate system conversion 174 can return the coordinates according to the target coordinate system (−2.94, −0.58, 3). The variable transform 163a can then transfer the global transform data to the base transform 143 in Cartesian coordinates.

Since the child cylindrical variable transform 163a includes a local radius of 0, this ensures that it will always share the radius of the cylindrical parent variable transform 163b. The user can specify that the azimuth of the child cylindrical variable transform 163a is expressed in radius-independent arclength, instead of radians, so that the distance between it and the cylindrical parent variable transform 163b will always be static along the curve, regardless of radius. By contrast, other systems cannot maintain a radius-independent arclength spacing when manipulating an object 130 or set of objects 130 through the custom transform editor 160. After the child cylindrical variable transform 163a has had its cylindrical values modified by inherited cylindrical values, they can be converted to Cartesian coordinates. The coordinates, rotation, scale, and other transform data can be passed back to the base transform 143 in Cartesian format. The three-dimensional engine 122 can then perform rendering by the engine renderer 149, as well as collision and other calculations.

Figure 3:
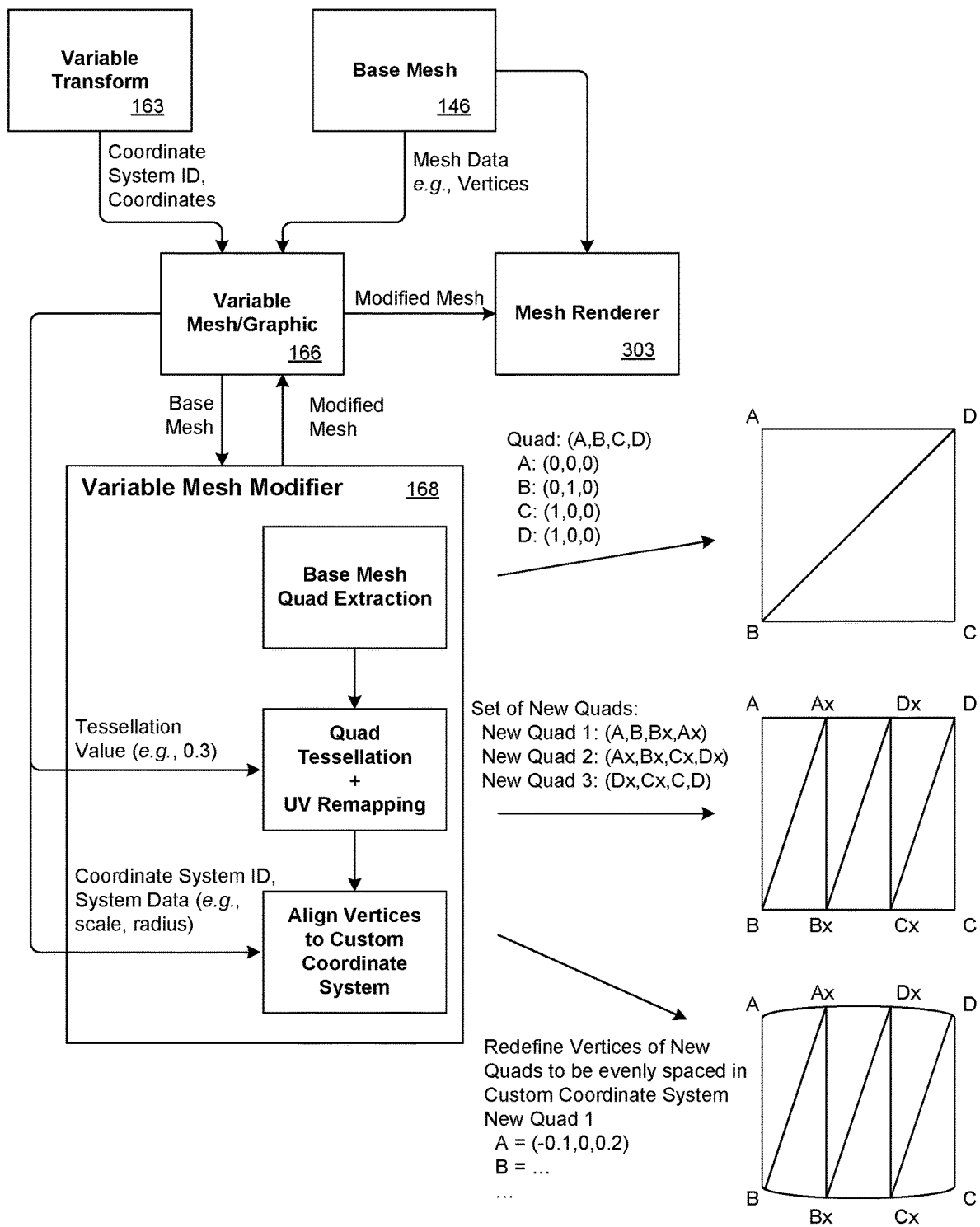
FIG. 3 is a drawing depicting an example of the implementation of a variable mesh or graphic for a three-dimensional engine, according to various embodiments of the present disclosure.

FIG. 3 shows an example of the implementation of a variable mesh 166 for a three-dimensional engine 122. While the figure generally describes the operation of the variable mesh 166 and the variable mesh modifier 168, some of the functionalities described involve other components of the networked environment 100 of FIG. 1.

The variable mesh 166 can include a core mesh manipulation class that intercepts mesh data of a base mesh 146, as well as coordinate system data from a variable transform 163, and passes it through a variable mesh modifier 168. The variable mesh 166 also provides a modified mesh to the mesh renderer 303 of the engine renderer 149. The modified or variable mesh data generated and stored by the variable mesh class can also be considered part of the variable mesh 166. In some cases, the variable mesh modifier 168 can be considered part of the variable mesh 166.

The variable mesh modifier 168 includes a set of functions that can be used to remap a base mesh 146 into a modified mesh with vertices that are normalized, evenly spaced, or equidistant according to a non-native or non-Cartesian coordinate system measurement. For example, remapping a plane so that the vertices are defined by arclengths rather than x-axis distances. This is different and more accurate than existing systems that project a cartesian graphic onto a non-Cartesian mesh. The system can also output a modified mesh with additional (or fewer) vertices than the base mesh 146. The variable mesh modifier 168 can take as input a base mesh 146 or base mesh data, coordinate system information, and a desired tessellation value. The variable mesh modifier 168 can generate an output that includes a modified mesh with vertices that are evenly spaced according to a non-native or non-Cartesian coordinate system.

The variable mesh modifier 168 can include a quad extraction, quad tessellation, UV remapping, and alignment to the non-native coordinate system of the variable transform 163. This can include the scale of the non-native coordinate system of the variable transform 163. A quad extractor component of the variable mesh modifier 168 can extract quads from the base mesh 146 including a quad (A, B, C, D), where A is (0, 0, 0), B is (0, 1, 0), C is (1, 0, 0), and D is (1, 0, 0). A quad tessellation and UV remapping component of the variable mesh modifier 168 can define a new set of quads that conforms to a specified tessellation value. For example, the original quad (A, B, C, D) can be further defined using a set of new quads including a new quad 1 (A, B, Bx, Ax), a new quad 2 (Ax, Bx, Cx, Dx), and a new quad 3 (Cx, Dx, C, D). Each of the vertices can be defined. A variable vertex alignment component of the variable mesh modifier 168 can align the vertices to be evenly spaced in the non-native coordinate system of the variable transform 163. For example, rather than being evenly spaced as defined by Cartesian axis distance, the vertices can instead be defined and evenly spaced based on arclength distances, or another non-native coordinate system measurement.

Figure 4:
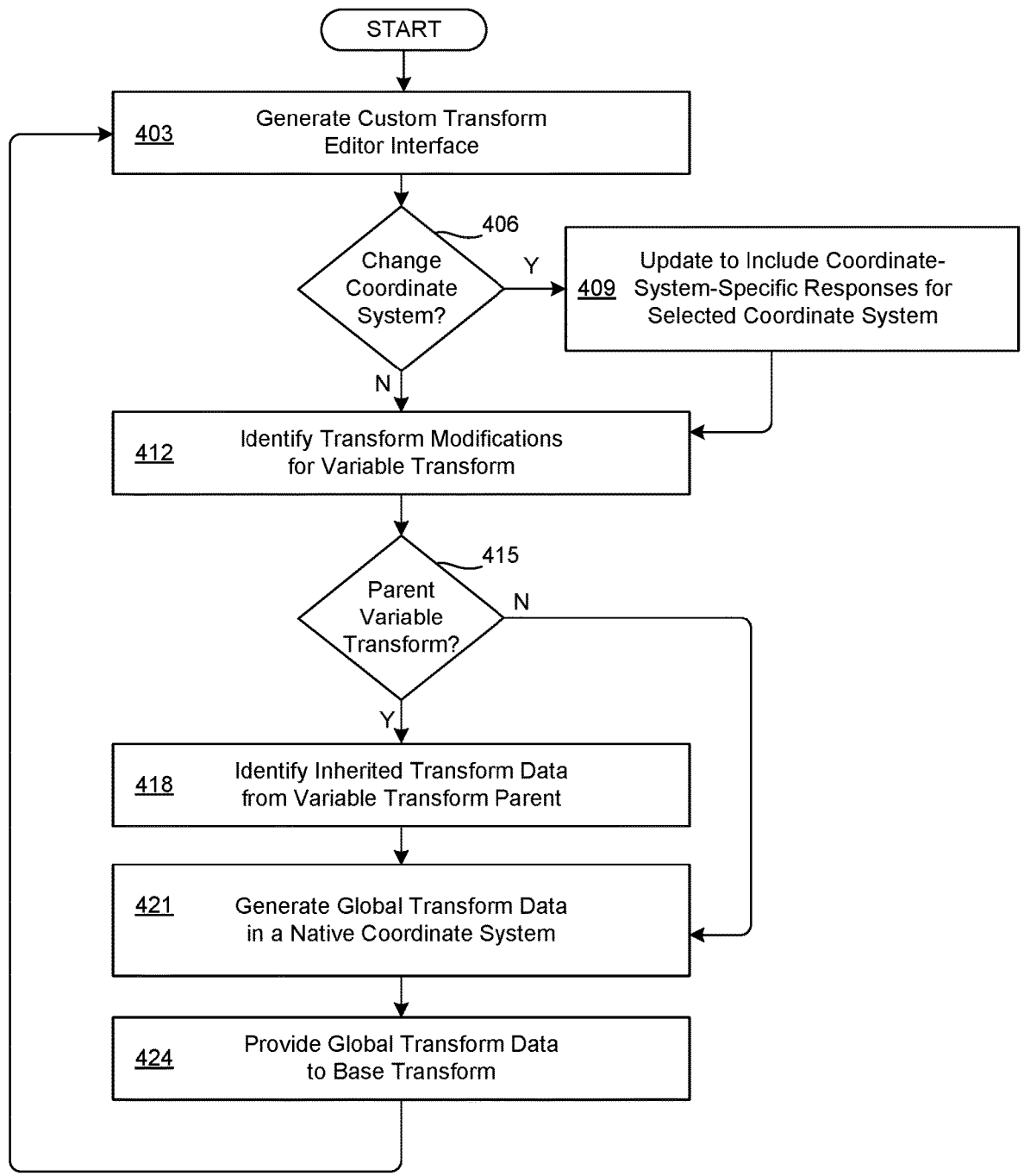
FIG. 4 is a flowchart illustrating an example of functionalities performed by components of the networked environment of FIG. 1 to implement a variable transform, according to various embodiments of the present disclosure.

FIG. 4 is a flowchart illustrating an example of functionalities performed by components of the networked environment of FIG. 1 to implement a variable transform, according to various embodiments of the present disclosure.

In step 403, the custom transform instructions 124 can generate a custom transform editor 160 interface. The custom transform editor 160 can include a user interface with a set of user interface elements that operate separately from the base transform editor 140. Alternatively, the custom transform editor 160 can include a set of user interface elements that augment or modify the base transform editor 140.

In step 406, the custom transform instructions 124 can determine whether a coordinate system has changed. For example, the custom transform editor 160 can enable a user to select from a set of coordinate systems that include the native coordinate system of the three-dimensional engine 122, as well as a number of non-native coordinate systems. If a user has changed a coordinate system by selecting a corresponding user interface element, then the process can move to step 409. Otherwise, the process can move to step 412.

In step 409, once a coordinate system is changed, the custom transform instructions 124 can update the custom transform editor 160 to include a coordinate-system-specific responses according to the selected coordinate system. If the user selects a non-native coordinate system, and the custom transform editor 160 can enable manipulation of an object 130 according to non-native coordinate system rules. For example, the custom transform editor 160 can enable a non-Cartesian manipulation of the object 130 such as moving the object to a predefined angle or arclength at a particular radius in a spherical or cylindrical coordinate system. The custom transform editor 160 can include a user interface of the three-dimensional engine 122 that allows a user to position and edit game, interface, and other objects 130 in a three-dimensional world space of the engine according to non-native coordinate system rules of a selected coordinate system.

In step 412, the custom transform instructions 124 can identify modifications for a variable transform 163. The user manipulations identified through the custom transform editor 160 can affect or edit transform data for the variable transforms 163 based on user interactions. In other words, the custom transform editor 160 can generate a visual interface that allows visual interactions to affect the variable transform 163 for an object 130. The custom transform editor 160 can also generate a textual user interface that allows textual editing of the variable transform 163 for an object 130 according to the selected non-native coordinate system.

In step 415, the custom transform instructions 124 can determine whether the variable transform 163 includes a parent variable transform 163. The parent variable transform 163 can also have its own parent. Each variable transform 163 can include hierarchical data that identifies any parent variable transforms 163. If the hierarchical data indicates that variable transform 163 includes a parent variable transform 163, the process can move to step 418. Otherwise, the process can move to step 424.

In step 418, the custom transform instructions 124 can retrieve parent or inherited transform data of the parent variable transform 163. The inherited transform data can be in any coordinate system, which can include the same coordinate system as the child variable transform 163, or a different coordinate system from the child variable transform 163.

In step 421, the custom transform instructions 124 can generate global transform data in a native coordinate system of the three-dimensional engine 122. If there is no parent transform then the custom transform instructions 124 can access the coordinate system library 127 to convert the variable transform 163 into the global transform data in the native coordinate system. However, if there is a child variable transform 163 and a parent variable transform 163, then the custom transform instructions 124 can combine the transform data of the child variable transform 163 and inherited transform data of the parent variable transform 163 in a common coordinate system. In some cases, this is performed by the child variable transform 163. The conversion process can include accessing the coordinate system library 127 to convert the transform data of the child variable transform 163 and/or the inherited transform data of the parent variable transform 163 to a particular coordinate system according to a particular coordinate system definition 170.

The coordinate system definition 170 can indicate a coordinate system as well as an expression type for certain coordinate system parameters. For example, the child variable transform 163 can use a spherical coordinate system with degrees for a polar measure, while the parent variable transform 163 uses a spherical coordinate system with arclength for the polar measure. The custom transform instructions 124 can first convert each to use radians, and then combine the spherical transform data in the common spherical coordinate system.

In another example, the child variable transform 163 can use a cylindrical coordinate system while the parent variable transform 163 uses a spherical coordinate system. The custom transform instructions 124 can convert the child variable transform 163 to spherical, the parent variable transform 163 to cylindrical, combine them to generate global transform data, and convert the global transform data into the native coordinate system of the three-dimensional engine 122. Alternatively, the custom transform instructions 124 can convert both the child variable transform 163 and the parent variable transform 163 to the native coordinate system of the three-dimensional engine 122, and combine them to generate global transform data in the native coordinate system.

In step 424, the custom transform instructions 124 can provide global transform data to the base transform 143 of the three-dimensional engine 122. Since the variable transforms 163 are maintained, modified, and stored separately from the base transform 143, the base transform 143 of the three-dimensional engine 122 can remain in the native coordinate system while the user can interact and define transforms in a non-native coordinate system. This also enables hierarchical effects that allow a user to define hierarchical transforms that can include a non-native coordinate system, or multiple non-native coordinate systems.

Figure 5:
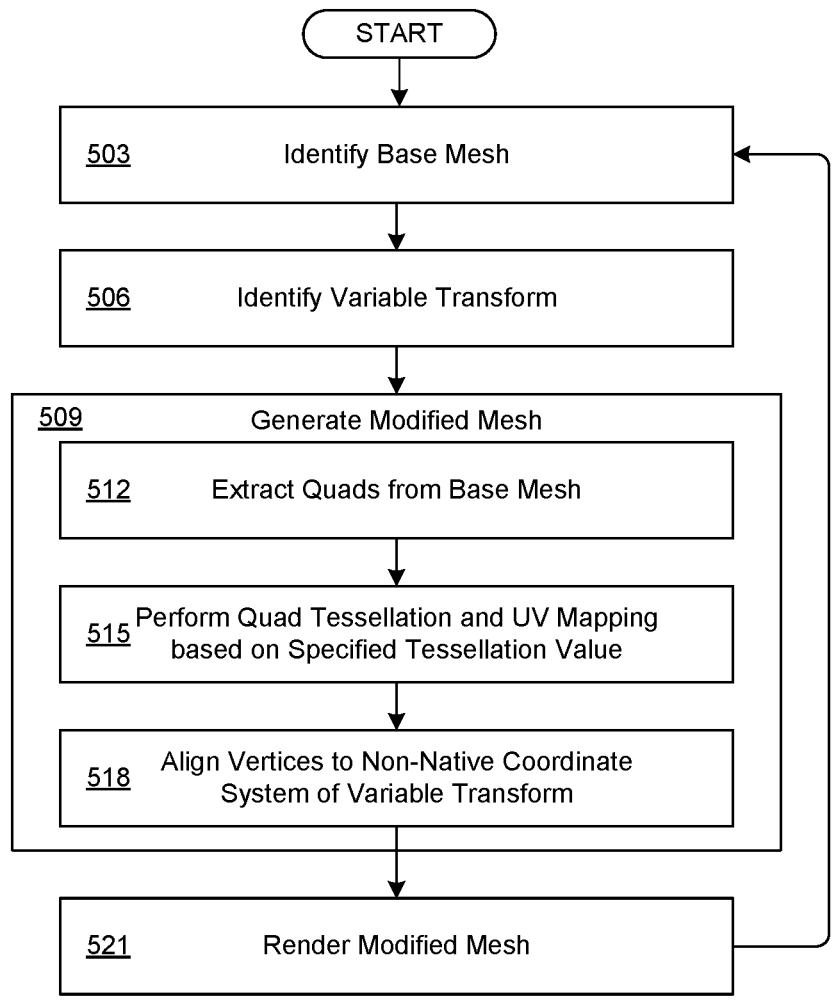
FIG. 5 is another flowchart illustrating an example of functionalities performed by components of the networked environment of FIG. 1 to implement a variable mesh or graphic, according to various embodiments of the present disclosure.

FIG. 5 is another flowchart illustrating an example of functionalities performed by components of the networked environment of FIG. 1 to implement a variable mesh or graphic, according to various embodiments of the present disclosure.

In step 503, the custom transform instructions 124 can identify a base mesh 146. For example, the variable mesh 166 can include a core mesh manipulation class that intercepts mesh data of a base mesh 146. The base mesh 146 can include base mesh data that defines locations of vertices according to the native coordinate system of the three-dimensional engine 122.

In step 506, the custom transform instructions 124 can identify a variable transform 163. The variable transform 163 can specify a non-native coordinate system, coordinates, radius, and other information that is then used to align vertices evenly spaced to the non-native coordinate system. The variable mesh 166 can identify the non-native coordinate system, coordinates, radius, and other information from the variable transform 163.

In step 509, the custom transform instructions 124 can generate a modified mesh. The modified mesh can be generated using the base mesh 146, a non-native coordinate system definition 170 of the non-native coordinate system, as well as coordinate system parameters such as the radius of a spherical or cylindrical non-native coordinate system. A tessellation value can also be used. A variable mesh modifier 168 of the custom transform instructions 124 can generate a modified mesh according to steps 512, 515, and 518.

In step 512, the custom transform instructions 124 can extract quads from the base mesh 146. The base mesh 146 can include a number of vertices. Each vertex can be defined according to the native coordinate system of the three-dimensional engine 122. In some cases, the base mesh 146 can specify quads which can include groups of four vertices. In other cases, the variable mesh modifier 168 can define a number of quads from the vertices of the base mesh 146.

In step 515, the custom transform instructions 124 can perform quad tessellation and UV mapping based on a specified tessellation value. The tessellation value can be a predefined or user-selected value. The tessellation process can include subdividing quads into smaller quads or another polygonal shape. It can be understood that while the present disclosure discusses the example of a four-sided quad, the quad in each context can also refer to any n-sided polygonal shape. This process can result in additional vertices, and the UV map of the mesh can be remapped to accommodate the additional vertices.

In step 518, the custom transform instructions 124 can align the vertices to a non-native coordinate system of the variable transform 163. While shown as a separate step, vertex alignment can be performed concurrently with tessellation and UV mapping. The vertices can be evenly spaced according to the non-native coordinate system data of the variable transform 163.

In step 521, a mesh renderer of the three-dimensional engine 122 can render the modified mesh. The custom transform instructions 124 can provide the modified mesh to the three-dimensional engine 122 for rendering on a display. For example, the variable mesh modifier 168 can output the modified mesh to the variable mesh 166, and the variable mesh 166 can transfer the modified mesh to the three-dimensional engine 122.

Figure 6:
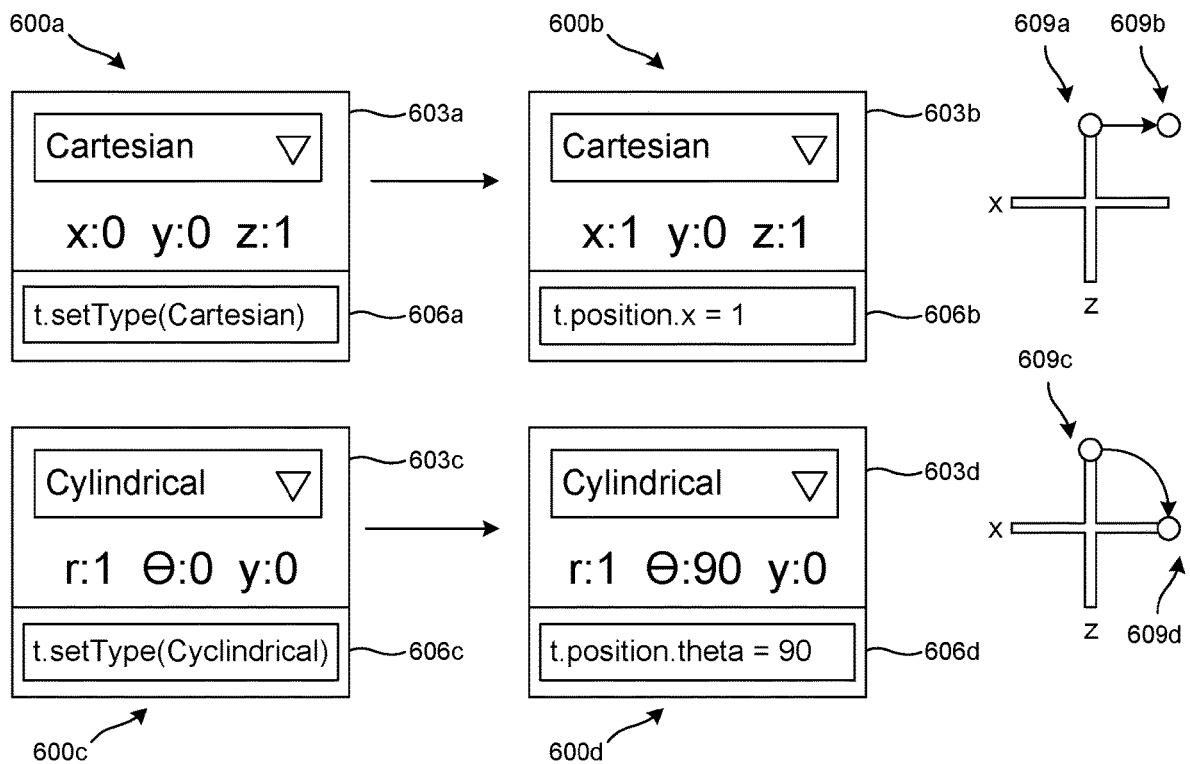
FIG. 6 is a drawing depicting an example of user interface elements of a custom transform editor to implement a variable transform, according to various embodiments of the present disclosure.

FIG. 6 shows an example of user interface elements of a custom transform editor 160 that utilizes a variable transform 163. The custom transform editor 160 can generate a user interface 600a that includes a user interface element 603a and a user interface element 606a. The user interface element 603a can enable a user to select from a set of coordinate systems that include the native (e. g., Cartesian) coordinate system of the three-dimensional engine 122, as well as a number of non-native (e. g., non-Cartesian) coordinate systems that are different from the native coordinate system of the three-dimensional engine 122. For example, the user interface element 603a can include a drop-down menu or another menu that includes a set of coordinate systems retrieved from the coordinate system library 127 or otherwise from the data store 121.

In the example of user interface 600a, the Cartesian coordinate system is selected. The selection of the Cartesian coordinate system can automatically enter or edit a parameter of the variable transform 163 to specify the Cartesian coordinate system. In some cases, expression type options can also be selected from another menu user interface element. The position 609a of an object 130 being transformed can be identified and displayed according to the selected coordinate system.

The user interface 600a can also include the user interface element 606a, which can be a text entry element through which a parameter of the variable transform 163 can be entered manually. In this case, the Cartesian coordinate system can be selected by entering "t.setType(Cartesian)", or another textual entry in appropriate syntax. Alternatively, the user interface element 606a can represent a user interface element that shows textual syntax effects applied to the variable transform 163 in response to the user interaction with the custom transform editor 160.

In the example of user interface 600b, the object 103 has been moved from position 609a to 609b. The updated position 609b of the object 130 being transformed can be identified and displayed according to the selected coordinate system. For example, the user interface 600b shows that the position 609b of the object 130 can be defined as x: 1, y:0, z:1, indicating that the object 130 has been moved in the positive x direction according to the Cartesian coordinate system. A user can drag and drop the object 130, or utilize other user interface interactions, and the custom transform editor 160 can provide responses such as moving the object according to a Cartesian grid spacing, or other Cartesian-specific responses.

The user interface 600b can also include the user interface element 606b, which can be a text entry element through which a parameter of the variable transform 163 can be entered manually. In this case, the x position can be altered by entering "t.position.x=1", or another textual entry in appropriate syntax. Alternatively, the user interface element 606b can represent a user interface element that shows textual syntax effects applied to the variable transform 163 in response to the user interaction with the custom transform editor 160.

In the example of user interface 600c, a user has specified to use a cylindrical coordinate system through the user interface element 603c. In this case, the position 609c of an object 130 being transformed can be identified and displayed according to the cylindrical coordinate system. The position 609c can be a translated version of the same position as the position 609a. In other words, if the object 130 has not yet been moved from its initial position, the custom transform editor 160 can identify that the cylindrical coordinate system has been selected, and can translate the coordinates and other transform data into cylindrical coordinates. The translated transform data can be shown and displayed according to the cylindrical coordinate system.

The user interface 600c can also include user interface element 606c, which can be a text entry element through which a parameter of the variable transform 163 can be entered manually. In this case, the Cartesian coordinate system can be selected by entering "t.setType(Cylindrical)", or another textual entry in appropriate syntax. Alternatively, the user interface element 606c can represent a user interface element that shows textual syntax effects applied to the variable transform 163 in response to user interaction with the custom transform editor 160.

In the example of user interface 600d, the object 103 has been moved from position 609c to 609d. The updated position 609d of the object 130 being transformed can be identified and displayed according to the selected coordinate system. For example, the user interface 600d shows that the position 609c of the object 130 can be defined as r: 1, θ:0, y:0, indicating that the object 130 has been moved 90 degrees according to the cylindrical coordinate system while maintaining the same radius r=1 and the same y-axis position of 0. A user can drag and drop the object 130, or utilize other user interface interactions, and the custom transform editor 160 can provide coordinate-system-specific responses such as moving the object a certain arclength grid spacing, degree measure, or radian measure, and another non-Cartesian-coordinate-system specific responses.

The user interface 600d can also include user interface element 606d, which can be a text entry element through which a parameter of the variable transform 163 can be entered manually. In this case, the theta angle or measure can be altered by entering "t.position.theta=90", or another textual entry in appropriate syntax. Alternatively, the user interface element 606d can represent a user interface element that shows textual syntax effects applied to the variable transform 163 in response to user interaction with the custom transform editor 160.

Figure 7:
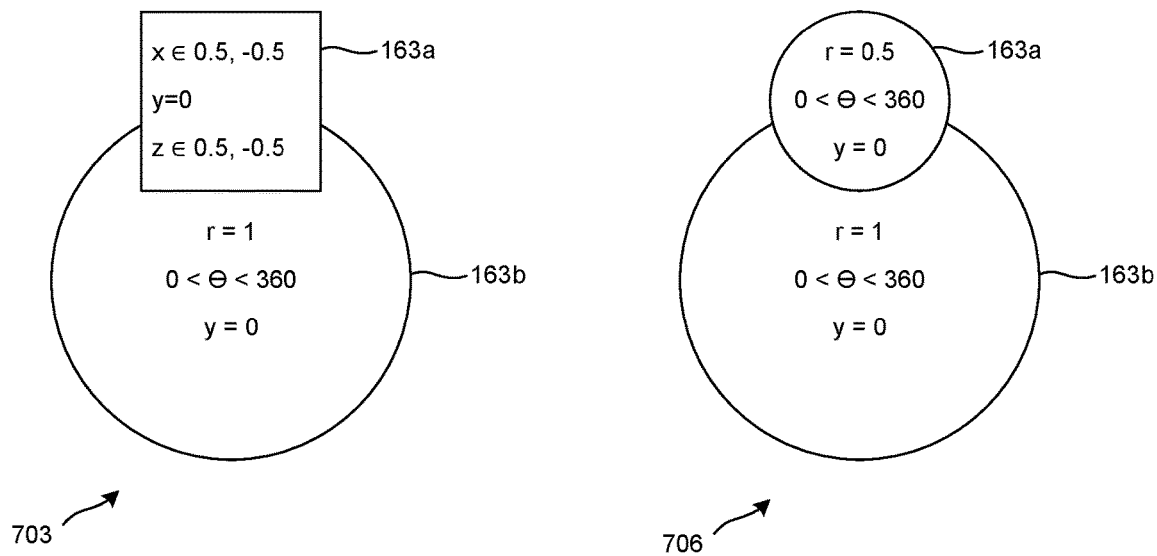
FIG. 7 is a drawing depicting examples of nested variable transforms, according to various embodiments of the present disclosure.

FIG. 7 shows of a nested variable transform set 703 and a nested variable transform set 706, according to various embodiments of the present disclosure. The nested variable transform set 703 involves a rectangular or Cartesian child variable transform 163a and a cylindrical parent variable transform 163b in a parent-child hierarchical relationship. In this case, the nested variable transform set 703 shows one way of describing a flat square object 130 that is described in Cartesian coordinates by the variable transform 163a, and further modified by and positioned relative to a flat circular object 130 described by the parent variable transform 163b. While these objects are substantially two dimensional for the purposes of clarity of description, they are described in three dimensions as shown, and can include and result in three-dimensional effects.

The nested variable transform set 706 involves a cylindrical child variable transform 163a and a cylindrical parent variable transform 163b. In this case, the nested variable transform set 703 shows one way of describing a flat circular object 130 that is described in cylindrical coordinates by the variable transform 163a, and further modified by and positioned relative to another flat, circular object 130 described by the parent variable transform 163b.

Although the services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although the flowcharts show a specific order of execution, it is understood that the order of execution can differ from that which is depicted. For example, the order of execution of two or more blocks can be scrambled relative to the order shown. The flowcharts can be viewed as depicting an example of a method implemented in the computing environment 103. The flowchart can also be viewed as depicting an example of instructions executed in a computing device of the computing environment 103. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A system, comprising:
   at least one computing device comprising at least one processor and at least one memory; and
   machine-readable instructions accessible to the at least one computing device, wherein the instructions, when executed by the at least one processor, cause the at least one computing device to at least:
- generate a custom transform editor interface that overrides a base transform editor interface included with a game engine that describes base transforms within a base transform class using a Cartesian coordinate system, wherein the custom transform editor interface enables a non-Cartesian user interface manipulation of an object according to predetermined arclengths, and defines the non-Cartesian user interface manipulation using a non-Cartesian system that is user selected from a plurality of user-selectable non-Cartesian system options of the custom transform editor interface;
- identify, by a variable transform class, transform data for a game object associated with a base transform class of the game engine;
- store, by the variable transform class, a variable transform object that expresses the transform data according to a non-Cartesian coordinate system;
- retrieve, by the variable transform class, inherited transform data for a parent variable transform comprising a parent instance of the variable transform class;
- generate, by the variable transform class, global transform data based at least in part on the transform data and the inherited transform data, wherein the global transform data is expressed according to a Cartesian coordinate system used by the game engine;
- transfer, by the variable transform class, the global transform data to the base transform class of the game engine; and
- position, by the game engine, the game object in a world space of the game engine based at least in part on the global transform data.

2. The system of claim 1, wherein the non-Cartesian coordinate system comprises a cylindrical coordinate system or a spherical coordinate system.

3. The system of claim 1, wherein the inherited transform data is expressed in a cylindrical coordinate system or a spherical coordinate system.

4. The system of claim 1, wherein the instructions also cause the at least one computing device to at least:
- convert, by the variable transform class, at least one of the transform data and the inherited transform data to a common coordinate system in order to generate the global transform data.

5. The system of claim 4, wherein the common coordinate system is the non-Cartesian coordinate system.

6. The system of claim 4, wherein the common coordinate system is the Cartesian coordinate system.

7. The system of claim 4, wherein the variable transform class converts the at least one of the transform data and an inherited coordinate based at least in part on a coordinate system conversion library.

8. A method implemented by instructions executed by at least one computing device, the method comprising:
- identifying a user selection of a non-Cartesian coordinate system that is different from a Cartesian coordinate system natively used by a three-dimensional engine;
- generating a custom transform editor interface that overrides a base transform editor interface included with the three-dimensional engine with the custom transform editor, wherein the custom transform editor interface enables a non-Cartesian user interface manipulation of an object according to predetermined arclengths, and defines the non-Cartesian user interface manipulation using a non-Cartesian system that is user-selected, wherein the object is associated with a base transform class of the three-dimensional engine that natively defines transforms according to the Cartesian coordinate system;
- identifying, by a variable transform class, non-Cartesian transform data from the non-Cartesian user interface manipulation;
- converting, by the variable transform class, the non-Cartesian transform data into Cartesian transform data based at least in part on a coordinate system conversion library; and
- transferring the Cartesian transform data from the variable transform class to the base transform class of the three-dimensional engine, wherein the three-dimensional engine positions the object in a world space of the three-dimensional engine.

9. The method of claim 8, wherein the non-Cartesian user interface manipulation comprises moving the object within the custom transform editor interface based at least in part on a polar measure from a polar axis.

10. The method of claim 8, wherein the predetermined arclength is at a predetermined radius from a local origin point.

11. The method of claim 8, wherein the non-Cartesian user interface manipulation comprises moving the object within the custom transform editor interface based at least in part on a non-linear path of the non-Cartesian coordinate system.

12. The method of claim 8, further comprising:
- identifying a second non-Cartesian coordinate system that is different from the Cartesian coordinate system and the non-Cartesian coordinate system; and
- updating the custom transform editor interface to enable a second non-Cartesian user interface manipulation according to the second non-Cartesian coordinate system.

13. The method of claim 12, further comprising:
- converting, by the variable transform class, the second non-Cartesian user interface manipulation from the second non-Cartesian coordinate system to updated Cartesian transform data expressed according to the Cartesian coordinate system; and
- transferring the updated Cartesian transform data from the variable transform class to the base transform class of the three-dimensional engine.

14. The method of claim 8, further comprising:
- identifying, by the variable transform class, inherited transform data for a parent variable transform comprising a parent instance of the variable transform class, wherein the Cartesian transform data is further generated based at least in part on the inherited transform data.

15. A non-transitory computer-readable medium comprising machine-readable instructions that, when executed by at least one processor, cause at least one computing device to at least:
- generate a non-native custom editor interface that overrides a base transform editor interface included with a three-dimensional engine that natively uses a Cartesian coordinate system, wherein the non-native custom editor interface enables a non-Cartesian user interface manipulation of an object according to predetermined arclengths within the non-native custom editor interface, and defines the non-Cartesian user interface manipulation using a non-Cartesian system that is user selected within the non-native custom editor interface;

identify, by a variable transform class, transform data for the object that is transformed by a base transform class of the three-dimensional engine;

retrieve, by the variable transform class, inherited transform data associated with a parent instance of the variable transform class;

generate, by the variable transform class, global transform data based at least in part on the transform data and the inherited transform data, wherein the global transform data is expressed according to a Cartesian coordinate system used by the three-dimensional engine; and transfer, by the variable transform class, the global transform data to the base transform class of the three-dimensional engine to position the object in a world space of the three-dimensional engine.

16. The non-transitory computer-readable medium of claim 15, wherein the inherited transform data is expressed in a non-Cartesian coordinate system.

17. The non-transitory computer-readable medium of claim 15, wherein the instructions also cause the at least one computing device to at least:

generate a visual transform editor interface that enables a non-Cartesian user interface manipulation of the object, wherein the transform data is identified based at least in part on the non-Cartesian user interface manipulation.

18. The non-transitory computer-readable medium of claim 15, wherein the instructions also cause the at least one computing device to at least:

generate a textual editor interface, wherein the transform data is identified based at least in part on text entered through the textual editor interface.

19. The non-transitory computer-readable medium of claim 15, wherein the transform data is expressed in a cylindrical coordinate system or a spherical coordinate system.

20. The non-transitory computer-readable medium of claim 15, wherein the inherited transform data is expressed in a cylindrical coordinate system or a spherical coordinate system.

* * * * *